June 23, 1953          S. FRANKEL          2,643,331
PULSE CONVERTING SYSTEM
Filed Oct. 2, 1944
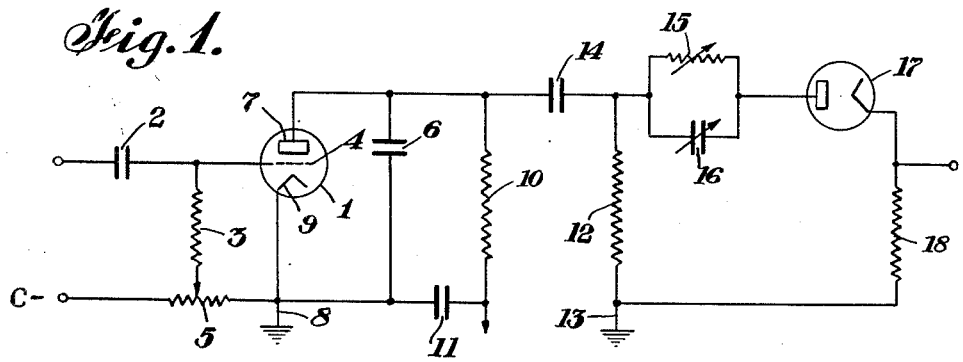
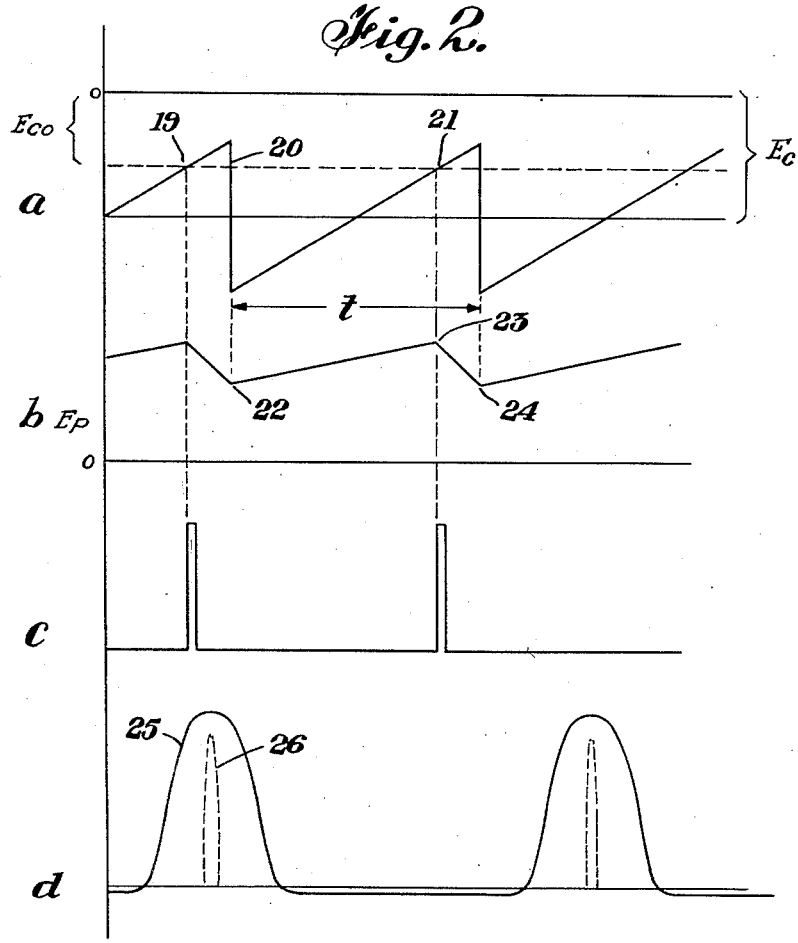
INVENTOR.
SIDNEY FRANKEL
BY
*Percy P. Lantry*
ATTORNEY Patented June 23, 1953

2,643,331

UNITED STATES PATENT OFFICE 2,643,331

PULSE CONVERTING SYSTEM

Sidney Frankel, Forest Hills, N. Y., assignor to Federal Telephone and Radio Corporation, New York, N. Y., a corporation of Delaware Application October 2, 1944, Serial No. 556,741

2 Claims. (Cl. 250—27)

This invention relates to radio circuits for producing pulses, and more particularly to circuits for converting relatively wide pulses or pulsations into narrow or sharply defined pulses.

Various applications in radio communication call for periodic pulses of a given width and having a certain time or phase relation with respect to a reference time base.

It is an object of this invention to provide a circuit utilizing a rectifier which is capable of delivering pulses in response to an alternating voltage input of an arbitrary character, wherein the timing and width of the pulses may be determined as desired.

In accordance with my invention, I provide a circuit which is adapted to convert the pulsations of the applied alternating voltage wave into saw-tooth type pulses, the occurrence of the peaks of which may be adjusted to suit the purpose at hand. The saw-tooth pulses thus obtained are then applied to a rectifier preceded by a resistance-capacitance filter combination which is adjustable in order to permit a variation in the width of the sharp pulses finally obtained thereby.

These and other objects and features will become more apparent as reference is made to the accompanying detailed description of a circuit by which the proposed method may be practiced, the detailed description to be read in connection with the accompanying drawings, in which:

Fig. 1 is a circuit diagram in schematic form in accordance with this invention; and Fig. 2 is a representation of a number of wave forms illustrating the operation of the circuit of Fig. 1.

Referring to Fig. 1, the alternating voltage which is to be converted into the sharpened pulses in accordance with this invention, may be applied to a triode 1 over a coupling circuit comprised of a capacitance 2 and a resistor 3 in the circuit of a grid 4. The grid 4 may be biased to a given value by means of an adjustable resistor 5. A capacitance 6 may be connected to the plate 7 and to ground 8 together with the cathode 9, that is, in such a way as to be short-circuited by the triode when the latter becomes conductive. The plate or anode 7 obtains its potential over a suitable resistor 10, the opposite end of which is connected to the cathode and to ground through a blocking condenser 11. The output of the triode 4 is applied over a coupling resistor 12 connected to ground at 13, a coupling condenser 14, and a resistance-capacitance filter circuit 15 and 16 to the anode of a diode rectifier 17. The resistor 15 is preferably of the adjustable type. An output resistor for the rectifier 17 is shown at 18, connected to the cathode of the rectifier and to the ground at 13.

In Fig. 2, graph $a$ indicates a representative type voltage as it may be applied to the grid 4 of the triode 1. The voltage of graph $a$ which is the applied grid voltage, is of a saw-tooth type, while the negative grid bias available over the resistors 3 and 5 indicated as $E_c$, may as already mentioned be varied over a given range in excess of the cut-off point $E_{co}$ of the triode. It is of course apparent that any variation in the value of $E_c$ will vary the point of intersection between the broken line representing the cut-off bias $E_{co}$ and the upward slope of each of the saw-teeth of the applied wave with respect to time. The significance of this variation with time of the aforesaid intersection will become apparent presently. Since the value of the grid bias has been chosen so as to be in excess of cut-off, the tube 1 would be conducting only during the interval from 19 to 20 (graph $a$). The tube 1 is accordingly non-conductive during the interval from 20 to 21. During the period of conductivity the tube acts as a normal amplifier. In graph $b$ there is shown the voltage on the plate 7 of the tube 1 with respect to ground. The variation in the plate voltage as shown in graph $b$ is determined by the charge and discharge of the capacitor 6 as controlled by the conductivity of the tube 1 in accordance with the applied grid voltage. Thus when the tube 1 is not conducting, the condenser 6 is able to charge up from the anode potential source in accordance with the portion of the graph between the reference points 22 and 23. As soon as tube 1 is enabled to conduct again, that is, starting at the point 19 or 21, the condenser 6 will discharge through the tube in accordance with the section of the graph at 23—24. As the grid voltage falls again to the level of points 20 the tube no longer conducts and the capacitor 6 recharges again through the resistor 10 in accordance with the portion of the graph 22—23. Thus a voltage with a well-defined maximum or peak is obtained. This maximum or peak, as is quite apparent, occurs when the instantaneous voltage on the grid 4 reaches the cut-off point 19. This cut-off may be selected to occur at any point of the scale by adjustment of the grid bias of the tube through the instrumentality of the resistor 5.

The voltage in accordance with graph $b$ is then applied over the coupling elements 12 and 14 to the resistance-capacitance filter 15—16 to the rectifier 17. As this voltage is being applied, capacitor 16 of the filter circuit will tend to charge to the positive peak value of the applied voltage. However, the adjustable resistor 15 is chosen to be of such a value as to permit some of the charge of the condenser 16 to leak off, so that the charge thereof may be periodically replenished during such time as the applied voltage is close to its positive peak value. It will be seen that the slower the rate of leak off, that is the larger the resistor 15 is, the shorter the period will be for recharging the capacitor 16. During the recharging time of the capacitor 16 a current pulse will flow through the rectifier 17 and hence through the output resistor 18, producing in consequence a voltage pulse thereacross. Thus it is clear that only the time of occurrence of the output pulses is dependent upon the input voltage. The duration of the output pulses is determined essentially by the constants of the resistance-capacitance filter circuit and may be readily adjusted by varying the resistor 15 as shown or the capacitor 16, or both. Representative pulses as obtained across the resistor 18 may be seen in graph c.

In all cases where the peak values of the applied voltage is sharply defined, so that there is only one such maximum positive value in each period, as in sinusoidal type voltages and others having recognizable peaks, the output pulse of the above circuit will occur at an instant just preceding this maximum value and for practical purposes may be considered as occurring at this maximum point. In case this maximum value point is not well-defined in each period, as in the case with square-topped pulses, the output pulse will occur at the first point at which the voltage equals its maximum value in any period.

The first portion of the circuit of Fig. 1, that is, the one centered around the triode 1 may be omitted if an adjustment in the timing or phasing of the ultimate pulses is not desired. If no such adjustment is desired, broad pulses of the type shown in graph d at 25 may be converted into narrow or sharply defined pulses 26 without the benefit of the circuit of the triode 1. In the latter case, it is seen that the sharpened pulses will occur substantially precisely at the time of the peaks of the original input pulses.

While a specific embodiment of the invention has been shown and described for purposes of illustration, it will be clear that modifications, additions and omissions may be made within the scope of the invention as defined in the appended claims.

For example, the resistance-capacitance filter circuit may be placed in the cathode circuit of the rectifier. Other modifications will occur to one skilled in the art. It is to be understood, therefore, that the form herein shown and described is to be regarded as illustrative of the invention only and not as limiting the objects thereof and the appended claims.

I claim:

1. In combination: a thermionic discharge tube having a grounded cathode, a grid and a plate; a pair of resistances connected in adjustable relation to one another and in series between said grid and said cathode, an input circuit connected between said grid and ground, a condenser connected in parallel to said plate and said cathode, an output circuit for said tube including a resistance and a source of potential connected between said plate and ground, a second condenser having one terminal connected to said plate, a fourth resistance connected between the other terminal of said second named condenser and ground, a rectifier, a resistance and a condenser in parallel connected in series between the junction of said second named condenser and said fourth named resistance and said rectifier and an output circuit for said rectifier including a resistance connected between said rectifier and ground.

2. In a system for producing sharply defined pulses from a saw-tooth type alternating voltage wave comprising in combination: a source for generating saw-tooth type alternations, means for adjusting the peaks of said saw-teeth with respect to time, an output circuit for said source; a resistance-capacitance filter, a diode rectifier, and an output circuit for said diode all connected in series across said first named output circuit, the filter and diode circuit being adapted to produce narrow pulses from said saw-tooth voltage, the peaks of said narrow pulses substantially coinciding with the peaks of said saw-teeth.

SIDNEY FRANKEL.

References Cited in the file of this patent

UNITED STATES PATENTS

| Number | Name | Date |
|---|---|---|
| 1,978,461 | Hoover et al. | Oct. 30, 1934 |
| 2,181,568 | Kotowski et al. | Nov. 23, 1939 |
| 2,188,611 | Norton | Jan. 30, 1940 |
| 2,251,851 | Moore | Aug. 5, 1941 |
| 2,265,290 | Knick | Dec. 9, 1941 |
| 2,357,652 | Haynes | Sept. 5, 1944 |
| 2,396,476 | Schade | Mar. 12, 1946 |
| 2,408,061 | Grieg | Sept. 24, 1946 |
| 2,426,201 | Grieg | Aug. 26, 1947 |